United States Patent
Abevi

(10) Patent No.: US 11,940,036 B2
(45) Date of Patent: Mar. 26, 2024

(54) PLANETARY ROLLER SCREW MECHANISM

(71) Applicant: Folly Abevi, Chambery (FR)

(72) Inventor: Folly Abevi, Chambery (FR)

(73) Assignee: ALT BEARINGS, Sainte-Helene-du-Lac (FR)

( * ) Notice: Subject to any disclaimer, the term of this patent is extended or adjusted under 35 U.S.C. 154(b) by 351 days.

(21) Appl. No.: 17/291,319

(22) PCT Filed: Oct. 18, 2019

(86) PCT No.: PCT/FR2019/052472
§ 371 (c)(1),
(2) Date: May 5, 2021

(87) PCT Pub. No.: WO2020/094937
PCT Pub. Date: May 14, 2020

(65) Prior Publication Data
US 2022/0018425 A1    Jan. 20, 2022

(30) Foreign Application Priority Data
Nov. 8, 2018 (FR) .................................. 1860270

(51) Int. Cl.
*F16H 25/20* (2006.01)
*F16H 25/22* (2006.01)
*F16H 55/08* (2006.01)

(52) U.S. Cl.
CPC ......... *F16H 25/2252* (2013.01); *F16H 55/08* (2013.01)

(58) Field of Classification Search
CPC .................. F16H 25/2252; F16H 55/08; F16H 2025/2257
See application file for complete search history.

(56) References Cited

U.S. PATENT DOCUMENTS 11,248,690 B2 *   2/2022   Dubus ................. F16H 25/2252
2015/0276030 A1 * 10/2015   Abevi ................. F16H 25/2252
                                                                  475/333

(Continued)

FOREIGN PATENT DOCUMENTS

EP       2784350 A1    10/2014
WO    2017030471 A1     2/2017

OTHER PUBLICATIONS

French Search Report dated Jun. 25, 2019 issued by INPI from corresponding Application No. FR 1860270, 1 page.

(Continued)

*Primary Examiner* — Zakaria Elahmadi
(74) *Attorney, Agent, or Firm* — Ware, Fressola, Maguire & Barber LLP

(57) ABSTRACT

A roller screw mechanism is provided comprising a screw with an outer thread, and a nut disposed around and coaxially with the screw and comprising an inner thread; and with rollers that each have an outer thread and inserted between the screw and the nut, each roller having two ends each provided with an outer gear teeth, each outer gear teeth having, in cross-section, an outer diameter less than or equal to a root diameter of the outer thread of the rollers; and two synchronizing gear teeth disposed coaxially to the screw and in which the outer gear teeth of the rollers engage, wherein the outer gear teeth of the rollers have teeth with a flank having, in cross-section, a convex hypotrochoidal profile and the synchronizing gear teeth have teeth with a flank having, in cross-section, a hypotrochoidal or epitrochoidal profile.

13 Claims, 3 Drawing Sheets

(56) References Cited

U.S. PATENT DOCUMENTS

2016/0091067 A1\* 3/2016 Abevi ................ F16H 25/2252
29/893.31
2016/0091068 A1\* 3/2016 Abevi ................ F16H 25/2252
409/58

OTHER PUBLICATIONS

PCT International Search Report and Written Opinion dated Jan. 17, 2020 from corresponding Application No. PCT/FR2019/052472, 11 pages.

\* cited by examiner

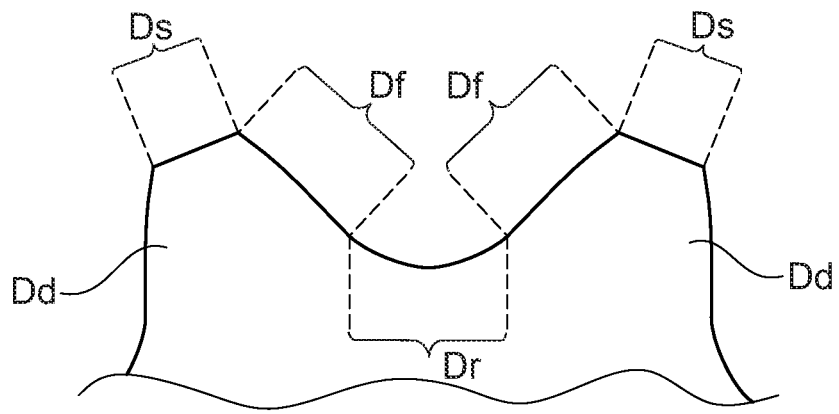
Fig. 2A
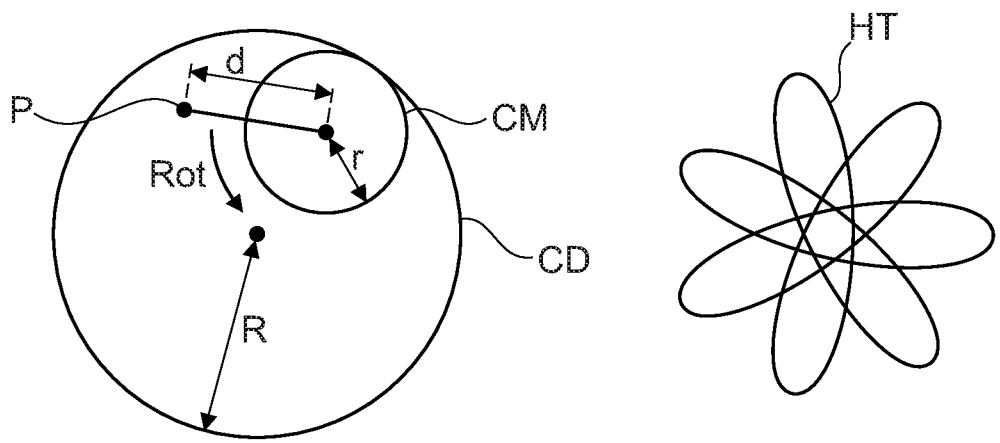
Fig. 2B
Fig. 2C
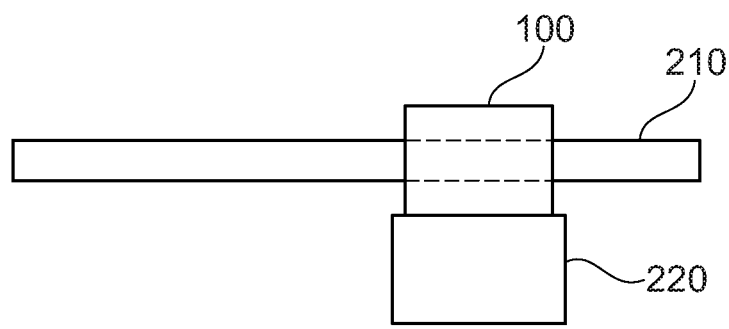
Fig. 2D

PLANETARY ROLLER SCREW MECHANISM

CROSS REFERENCE TO RELATED APPLICATIONS

This application is the U.S. National Stage of International Application No. PCT/FR2019/052472 filed on Oct. 18, 2019, which application claims priority under 35 USC § 119 to French Patent Application No. 1860270 filed on Nov. 8, 2018. Both applications are hereby incorporated by reference in their entirety.

TECHNICAL FIELD

The invention relates to the field of planetary roller screw mechanisms.

PRIOR ART

A planetary roller screw mechanism typically comprises a screw provided with an outer thread, with a nut disposed around and coaxially with the screw and comprising an inner thread, and with rollers that each have an outer thread and inserted between the screw and the nut such that the outer thread of the roller engages with the outer thread of the screw and the inner thread of the nut, each roller having two ends each provided with outer gear teeth.

Furthermore, the mechanism has two synchronizing gear teeth coaxial to the screw and in which the outer gear teeth of the rollers engage.

As the screw rotates around its axis with respect to the nut, the rollers rotate on themselves and the synchronizing gear teeth guide the rollers in rotation such that their longitudinal axes remain parallel to the longitudinal axis of the screw.

The European patent EP 2 784 350 B1 discloses a roller screw mechanism whereof the outer gear teeth of the rollers have, in cross-section, an outer diameter less than or equal to a root diameter of the outer thread of the rollers, the gear teeth being therefore situated below the roots of the threads, which avoids any interference between the threads and the gear teeth of the rollers, but requires necessary particular gear teeth profiles to fit the reduced diameter of the ends of the rollers.

In this mechanism, the roller gear teeth engage with inner gear teeth of gear wheels that constitute the synchronizing gear teeth, these inner gear teeth comprising teeth having, in cross-section, a flank that has a convex profile and the gear teeth of the rollers comprising teeth having, in transverse cross-section, a flank that has a hypocycloidal concave profile.

International Patent Application WO 2017/030741 describes a bilateral lantern-cycloidal gearing of two gear wheels characterized in that the heads of the teeth of each gear wheel have a curved convex profile while the teeth's base of each gear wheel have a trochoidal concave profile tangentially connected to the head's profile.

SUMMARY OF THE INVENTION

The mechanism of the Patent EP 2 784 350 has an insufficient contact ratio at the interface between the gear teeth of the rollers and the synchronizing gear teeth, the contact ratio characterizing the number of teeth engaged with each other, and has to be high to indicate a good load distribution, that decreases the effects of fatigue, vibrations and noise on the teeth.

A planetary roller screw mechanism according to the present application improves the contact ratio at the interface between the roller gear teeth and the synchronizing gear teeth in a mechanism avoiding the interference phenomenon between the threads and the roller gear teeth.

A planetary roller screw mechanism according to the present application comprises a screw provided with an outer thread; a nut disposed around and coaxially with the screw and comprising an inner thread; and rollers that each have an outer thread and inserted between the screw and the nut such that the outer thread of the roller engages with the outer thread of the screw and the inner thread of the nut, each roller having two ends each provided with outer gear teeth, each outer gear teeth having, in cross-section, an outer diameter less than or equal to a diameter of the root of the outer thread of the rollers; and two synchronizing gear teeth coaxial to the screw and in which the outer gear teeth of the rollers engages, and wherein said outer gear teeth of the rollers have teeth with a flank having, in cross-section, a convex hypotrochoidal profile and said synchronizing gear teeth have teeth with a flank having, in cross-section, a hypotrochoidal or epitrochoidal profile.

In such a mechanism, based on hypotrochoidal profiles, the contact ratio is improved with respect to the case where the roller gear teeth have teeth with a concave hypocycloidal profile by increasing the time where, during the rotation of a roller, at least a tooth of the gear tooth of the roller is in contact with the corresponding synchronizing gear tooth, in other words, by increasing the angle swept by a tooth of the roller between the start and the end of its engaging with a tooth of the synchronizing gear teeth.

Moreover, improving the contact ratio facilitates the mounting of the rollers and thus the assembly of the mechanism, the rollers better hold in place when positioned in the nut, in the case of a standard roller screw, or on the screw, in the case of an inverted roller screw.

Another advantage of the proposed mechanism is that it can be applied to planetary roller screws, not only for small advances, but also for big advances, enabling to produce, for roller screws of the same design, a complete range of advances.

Advantageously, the roller screw mechanism may have the following features:
- the roller screw may be a standard roller screw and the synchronizing gear teeth may be an inner gear teeth coaxially surrounding the screw, the teeth of which have a flank with a concave hypotrochoidal profile in cross-section.
- the roller screw can be an inverted roller screw and the synchronizing gear teeth may be outer gear teeth carried by the screw and whose teeth have a flank with a convex epitrochoidal profile in cross-section.
- the profiles may be defined by the path of a point connected to a moving circle rolling without sliding on a directing circle, a ratio between the distance of the point connected to the center of the moving circle and a radius of the moving circle can be comprised between 0.1 and 0.95 or between 1.05 and 4, and a ratio between a radius of the directing circle and a radius of the moving circle can be comprised between 1 and 6, and
- the ratio between the radius of the directing circle and the radius of the moving circle can be comprised between 1.7 and 2.5.

The present application also provides for an actuator device including a planetary roller screw mechanism mounted on a rod and coupled with a mechanical or electromechanical drive system.

According to the present application, the so-called hypotrochoidal or epitrochoidal profiles comprise profiles following a hypotrochoid or an epitrochoid, respectively, as well as arc shaped profiles approximating a hypotrochoid or epitrochoid, respectively.

BRIEF DESCRIPTION OF THE DRAWINGS

The present invention will be better understood and further advantages will appear from the following detailed description of embodiments taken as non-limiting examples and illustrated by the appended drawings, in which:

FIG. 2A shows a portion of gear teeth;

FIGS. 2B and 2C respectively show the principle of generating a hypotrochoid and a hypotrochoid;

FIG. 2D shows an actuator including the planetary roller screw of FIG. 1A;

DETAILED DESCRIPTION OF THE FIGURES

A first embodiment of the roller screw mechanism is described with reference to FIGS. 1A through 2C.

Figure 1A:
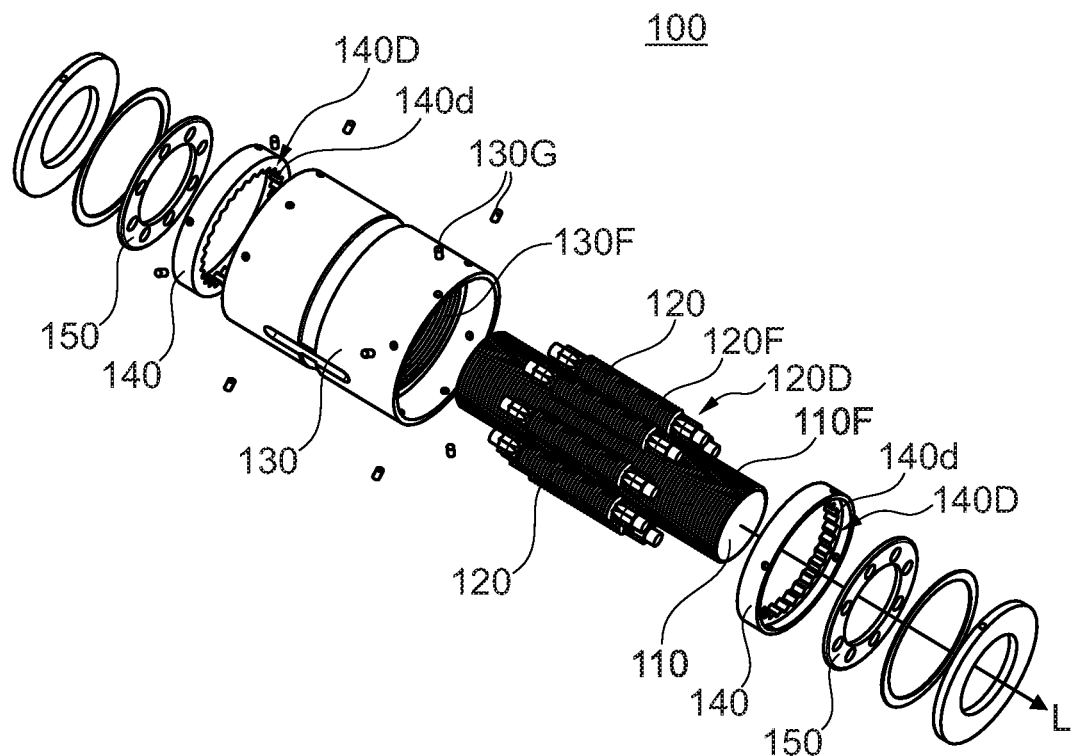
FIG. 1A is an exploded view of a planetary roller screw of a first embodiment of the application.
Figure 1B:
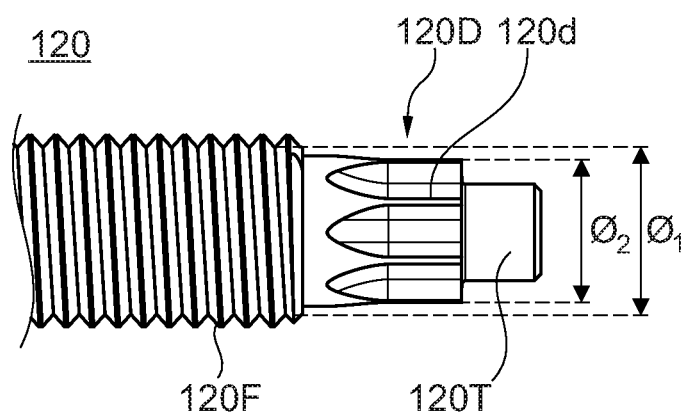
FIGS. 1B and 1C respectively show longitudinal and transverse views of a roller.
Figure 1C:
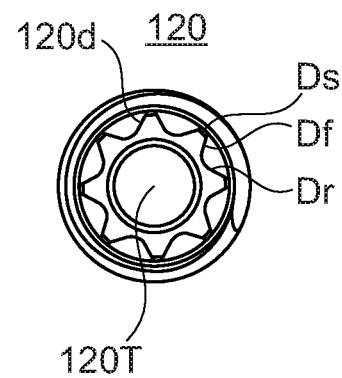

As shown in FIGS. 1A through 1C, a standard roller screw mechanism 100 according to a first embodiment typically includes a screw 110, a nut 130 disposed around and coaxially with the screw, and a plurality of rollers 120 inserted between the screw and the nut and longitudinal axes parallel to the one of the screw.

The screw and the rollers are provided with outer threads 110F and 120F, respectively, and the nut is provided with an inner thread 130F.

The rollers further comprise outer gear teeth 120D located at their ends and, in this particular embodiment, smooth cylindrical journals 120T extending their ends.

FIG. 1B shows a roller end, provided with an outer gear teeth (120D) having, in transverse cross-section, an outer diameter ($\varnothing_2$) less than or equal to a root diameter ($\varnothing_1$) of the outer thread (120F) of the rollers.

The threads of the rollers are intended to engage with the threads of the screw and of the nut.

A roller holding and guiding device comprises roller holders 150 that are mounted coaxially with the screw between the screw and the nut, with bores intended to receive the journals 120T of the rollers 120.

The holding device also comprises two synchronizing gear teeth consisting of inner gear teeth 140D provided with teeth 140d located on the side of the nut, coaxially with the screw and in which teeth 120d of the outer gear teeth 120D located to respective ends of the rollers 120 engage.

The inner gear teeth 140D, in this particular embodiment, are mounted on two respective ring gears 140 fixed to the nut by means of pins 130G, such that these inner gear teeth follow the inner periphery of the nut and are secured thereto.

Alternatively, the ring gears could be integrated into the mass of the nut, or bonded or fixed by fastening screws to it.

The threads of the rollers have a helix angle corresponding to that of the nut, such that when the screw is rotating around its longitudinal axis L with respect to the nut, the rollers, held by the roller holders, rotates on themselves by moving in rotation along the inner periphery of the nut while remaining axially static with respect thereto, the nut being driven in a translational motion.

The gear teeth 120D of the rollers 120 engage with the gear teeth 140D of the ring gears 140, the rollers being thereby guided by these gear teeth which ensure the parallelism of the rollers with respect to the screw and the regularity of their movement in the nut.

FIG. 2A shows in a generic manner gear teeth D made up of tops Ds of teeth Dd, connection regions Dr connecting two contiguous teeth Dd at their bases, and flanks Df of teeth each of which connects a top Ds to a connection region Dr; this constitution applies to both outer gear teeth and inner gear teeth.

The tops Ds and the connection regions Dr are not intended to come into contact with other elements, such that they can have any geometries, as long as they don't interfere with the operation of the roller screw.

Conversely, the flanks Df of the roller gear teeth are intended to come into direct mechanical contact with the flanks of the synchronizing gear teeth and the roller gear teeth have tooth flanks which have, in cross-section, a convex hypotrochoidal profile, whereas the synchronizing gear teeth have tooth flanks which may have in cross-section a concave or straight profile, but which preferably have a concave hypotrochoidal profile.

The profiles of the flanks of the gear teeth are defined by trochoids, the tops Ds and the connection regions Dr correspond to locations of these trochoids that are truncated so as not to interfere with the operation of the roller screw.

A hypotrochoidal profile is a profile that follows a hypotrochoid, such the hypotrochoid HT shown in FIG. 2C, namely a curve generated by the path of a point P linked to a moving circle CM of radius r rolling without sliding on and inside a directing circle CD of radius R according to a rotation Rot, the moving circle being less than the directing circle, as shown in FIG. 2B.

The hypotrochoid generated as explained above can be defined by the following equations:

$$\begin{cases} x(\theta) = r(k-1)\cos(\theta) + a \times r\cos((k-1)\theta) \\ y(\theta) = r(k-1)\sin(\theta) - a \times r\sin((k-1)\theta) \end{cases}$$

with $(x(\theta), y(\theta))$ meaning the coordinates of a point M of the hypotrochoidal curve HT, $\theta$ being an angular parameter between the values $\theta$min and $\theta$max, a being a parameter representing the ratio between the distance d from point P to the center of the moving circle CM and the radius r of this moving circle, and the parameter k being R/r.

For the roller gear teeth, the values of k are equal to $k_{rlx}$ and are preferably comprised between 1 and 6, more preferably between 1.7 and 2.5, and even more preferably between 1.85 and 2.25, or within the foregoing ranges having their upper limits limited to 2, while the values of the parameter a are between 0.1 and 0.95 or between 1.05 and 4, included.

For a given mechanism according to the application, two hypotrochoidal curves defining, respectively, the roller tooth profile and the profile of inner synchronizing gear teeth have a common parameter a, but parameters k, $k_{rlx}$ and $k_{ecr}$, respectively, can be distinct and defined by the person skilled in the art, with $k_{ecr}$ being bounded to the value $k_{rlx}$ by the following relationship: $k_{ecr} = k_{rlx} \times (N_{ecr}/N_{rlx})$ where $N_{ecr}$ and $N_{rlx}$ are, respectively, the number of threads on the nut and the number of threads on the rollers, their ratio being between 3 and 10, included.

An advantage to the trochoidal, hypotrochoidal profiles with the parameter a deviating from the value 1, is their adaptability to all configurations of synchronizing gear teeth, through the possibility of adjusting the two parameters a and $k_{rlx}$ and of using the values close to 2 for the parameter $k_{rlx}$, this last point leading to teeth with heights sufficiently high to obtain high contact ratios showing a good fluidity of the engaging movement of the gear teeth.

A second embodiment of the roller screw mechanism is described with reference to FIGS. 1A to 2A and 3A to 3C.

Figure 3A:
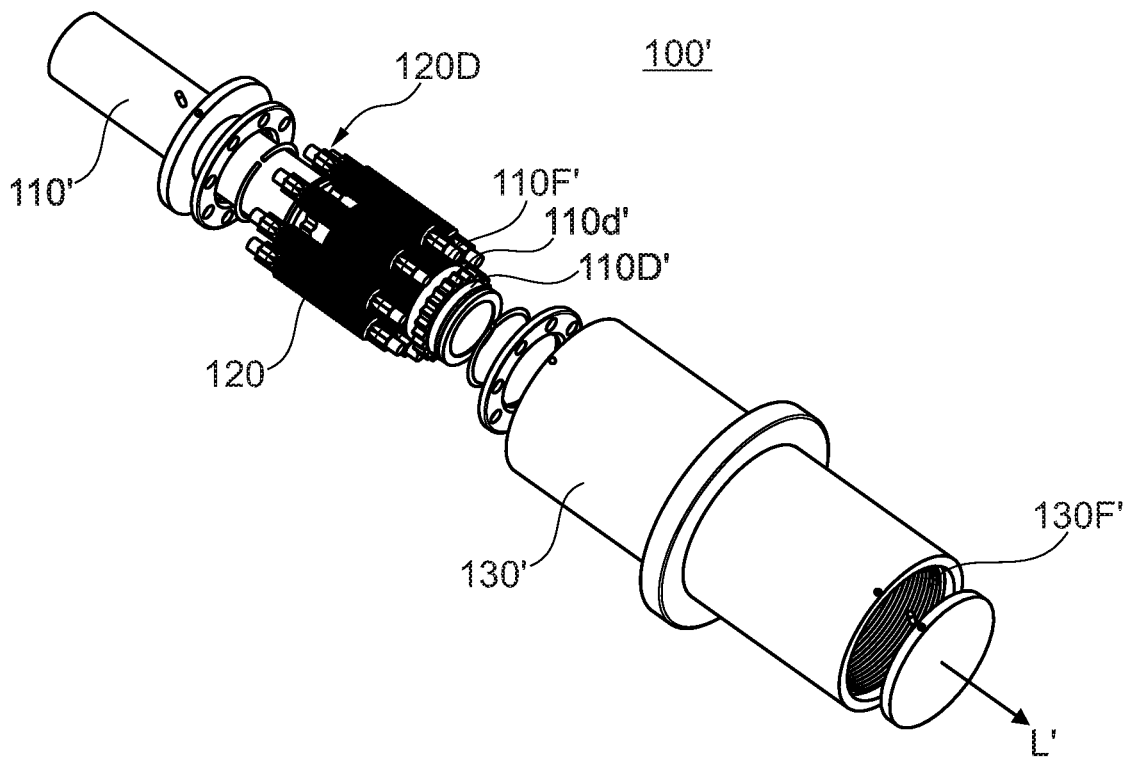
FIG. 3A is an exploded view of a planetary roller screw of a second embodiment of the invention.

While the first embodiment relates a standard planetary roller screw 100, the second embodiment related an inverted planetary roller screw 100', shown in FIG. 3A, which is based on the same operating principle than the standard screw, but whereof nut system is inverted, the ring gears 140 being removed, the inner synchronizing gear teeth 140D being replaced by an outer gear teeth 110D' carried by the screw 110', and the screw 110' and the nut 130' being suitable to the previous modifications.

The outer gear teeth may be integrated into the mass of the screw, or bonded or fixed by fastening screws to it.

Except the above mentioned elements, it is possible to refer to the first embodiment concerning the general structure of an inverted planetary roller screw, the structure of the rollers, and the components of gear teeth and their respective functions.

In this second embodiment, when the screw 110' is rotating around its longitudinal axis L' with respect to the nut 130', the rollers 120' rotate on themselves around the screw and move axially in the nut.

The gear teeth 120D of the rollers 120' engage with the gear teeth 110D' of the screw 110', the rollers 120' being thereby guided by the gear teeth 110D' of the screw 110', which ensure the parallelism of the rollers 120' with respect to the screw 110' and the regularity of their movement around the screw 110'.

In this embodiment, the roller gear teeth 120D have tooth flanks Df which have, in cross-section, a convex hypotrochoidal profile, while the synchronizing gear teeth have tooth flanks Df which have, in cross-section, a convex, straight or concave profile, but preferably a convex epitrochoidal profile.

The case of hypotrochoidal profiles has been discussed in the description of the first embodiment, to which it is possible to refer.

Figure 3B:
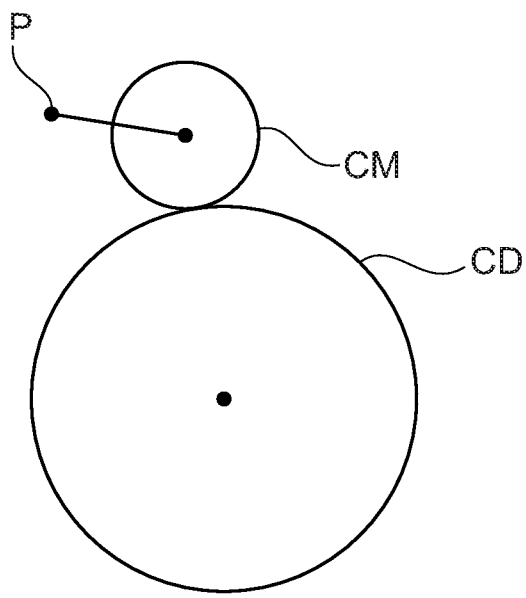
FIGS. 3B and 3C respectively show the principle of generating an epitrochoid and an epitrochoid.
Figure 3C:
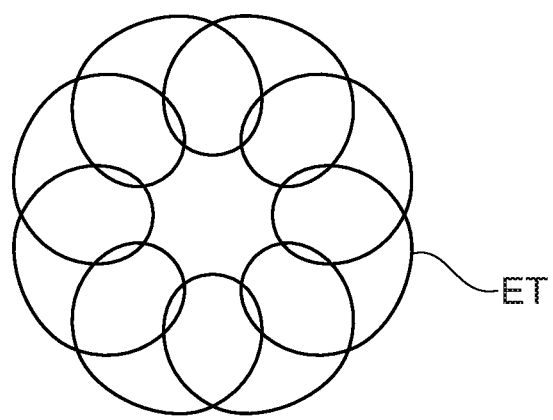

An epitrochoidal profile is a profile following an epitrochoid and shown in FIG. 3C, i.e., a curve generated in the same way as the hypotrochoid described above, but with a moving circle CM situated outside the directing circle CD, as shown in FIG. 3B.

As with the hypotrochoid, the equation of the epitrochoid can be expressed by:

$$\begin{pmatrix} x(\theta) = r(k+1)\cos(\theta) - a \times r\cos((k+1)\theta) \\ y(\theta) = r(k+1)\sin(\theta) - a \times r\sin((k-1)\theta) \end{pmatrix}$$

The possible values and the preferred values of the parameters a and $k_{rlx}$ are the same as in the case of the first embodiment, and the parameter a is common to the profile of the teeth of the rollers and to the tooth profile of the synchronizing gear teeth but, in this second embodiment, the synchronizing gear teeth are external and have a parameter k being $k_{vis}$, related to the value $k_{rlx}$ by the following relationship: $k_{vis}=k_{rlx}\times(N_{vis}/N_{rlx})$ where $N_{vis}$ and $N_{rlx}$ are, respectively, the number of threads on the screw and the number of threads on the rollers, their ratio being in a range from 1 to 10, bounds included.

The epitrochoidal and hypotrochoidal profiles of this embodiment offer the same advantages as the hypotrochoidal profiles of the first embodiment, particularly with respect to the contact ratios.

NUMERICAL EXAMPLES

Table 1 below compares the interface contact ratios between the gear teeth of the rollers and the synchronizing gear teeth of the first and second embodiments (standard screw and inverted screw), and on the other hand for identical gear teeth except for the tooth profiles, cycloidal (particular case of a trochoid where the parameter a is 1), for a parameter $k_{rlx}$ set to 2.

The contact ratios are calculated from the number of threads of the nut (standard screw) or of the screw (inverted screw), the maximum pitch, the partial radius and the number of teeth of the rollers, values set respectively at 5, 3, 4 mm, 5 mm and 10 for all the configurations of the table.

It should be noted that setting $k_{rlx}$ to 2 means choosing a theoretical value of $k_{rlx}$ that is unusable in practice for the case of cycloids because, in these, the thicknesses of the teeth decrease as $k_{rlx}$ approaches 2 and become zero at this value, but allows a good comparison with the trochoidal case of the application over the range of values of the parameter a in the table: this value is the most favorable to obtain a high contact ratio in the case of cycloidal profiles.

Over the whole range of values considered, the contact ratios are better for a trochoidal-type gear teeth than for the cycloidal-type gear teeth, and this observation can be generalized to the other values of the parameter a as long as the number of roller teeth is suitable.

TABLE 1

| Screw type | Gear teeth type | Parameter a | | | |
| --- | --- | --- | --- | --- | --- |
| | | 1.6 | 1.8 | 2.0 | 2.2 |
| Inverted | Trochoidal | 0.71 | 0.78 | 0.87 | 1.00 |
| | Cycloidal | 0.63 | 0.63 | 0.63 | 0.63 |
| Standard | Trochoidal | 0.87 | 0.94 | 1.06 | 1.39 |
| | Cycloidal | 0.84 | 0.84 | 0.84 | 0.84 |

Hypotrochoidal and epitrochoidal gear teeth can be manufactured by a material removal technique such as machining or grinding, by a deformation technique such as rolling, or by a material addition technique such as powder sintering or printing.

An actuator schematically shown in FIG. 2D takes advantage of the planetary roller screw mechanism 100 described above, secured with a rod 210, which may be constituted by the screw 110, and coupled to a mechanical or electromechanical drive system 220, for example to form a mechanical actuator, but it is also possible to use the mechanism 100' instead of the mechanism 100.

What is claimed is:

1. A planetary roller screw mechanism comprising a screw provided with an outer threat; a nut disposed around and coaxially with the screw and comprising an inner thread; and rollers that each have an outer thread and inserted between the screw and the nut such that the outer thread of the roller engages with the outer thread of the screw and the inner thread of the nut, each roller having two ends each provided with an outer gear teeth, each outer gear teeth having, in cross-section, an outer diameter less than or equal to a root diameter of the outer thread of the rollers; and two synchronizing gear teeth coaxial with the screw and in which the outer gear teeth of the rollers engage, wherein said outer gear teeth of the rollers have teeth with a flank having, in cross-section, a convex hypotrochoidal profile and said synchronizing gear teeth have teeth with a flank having, in cross-section, a hypotrochoidal or epitrochoidal profile.

2. The planetary roller screw mechanism according to claim 1, wherein the roller screw is a standard roller screw and the synchronizing gear teeth are inner gear teeth around and coaxially with the screw and whose teeth have a flank with a concave hypotrochoidal profile in cross-section.

3. The planetary roller screw mechanism according to claim 1, wherein the roller screw is an inverted roller screw and the synchronizing gear teeth are outer gear teeth carried by the screw and whose teeth have a flank with a convex epitrochoidal profile in cross-section.

4. The planetary roller screw mechanism according to claim 1, wherein the profiles of the flanks of the outer gear teeth of the rollers and the synchronizing gear teeth are defined by a path of a point linked to a moving circle rolling without sliding on a directing circle, a ratio between the distance of the point linked to the center of the moving circle and a radius of the moving circle is between 0.1 and 0.95 or between 1.05 and 4, and a ratio between a radius of the directing circle to a radius of the moving circle is between 1 and 6.

5. The planetary roller screw mechanism according to claim 4, wherein the ratio of the radius of the directing circle to the radius of the moving circle is between 1.7 and 2.5.

6. An actuator device comprising the planetary roller screw mechanism according to claim 1, mounted on a rod and coupled to a mechanical drive system.

7. The planetary roller screw mechanism according to claim 2, wherein the profiles of the flanks of the outer gear teeth of the rollers and the synchronizing gear teeth are defined by a path of a point linked to a moving circle rolling without sliding on a directing circle, a ratio between the distance of the point linked to the center of the moving circle and a radius of the moving circle is between 0.1 and 0.95 or between 1.05 and 4, and a ratio between a radius of the directing circle to a radius of the moving circle is between 1 and 6.

8. The planetary roller screw mechanism according to claim 7, wherein the ratio of the radius of the directing circle to the radius of the moving circle is between 1.7 and 2.5.

9. The planetary roller screw mechanism according to claim 3, wherein the profiles of the flanks of the outer gear teeth of the rollers and the synchronizing gear teeth are defined by a path of a point linked to a moving circle rolling without sliding on a directing circle, a ratio between the distance of the point linked to the center of the moving circle and a radius of the moving circle is between 0.1 and 0.95 or between 1.05 and 4, and a ratio between a radius of the directing circle to a radius of the moving circle is between 1 and 6.

10. The planetary roller screw mechanism according to claim 9, wherein the ratio of the radius of the directing circle to the radius of the moving circle is between 1.7 and 2.5.

11. An actuator device comprising the planetary roller screw mechanism according to claim 5, mounted on a rod and coupled to a mechanical drive system.

12. An actuator device comprising the planetary roller screw mechanism according to claim 8, mounted on a rod and coupled to a mechanical drive system.

13. An actuator device comprising the planetary roller screw mechanism according to claim 10, mounted on a rod and coupled to a mechanical drive system.

\* \* \* \* \*